United States Patent
Dudley et al.

[11] 3,892,440
[45] July 1, 1975

[54] AUTOMOBILE SEAT COVER

[75] Inventors: Richard J. Dudley; Harold A. Dudley, both of Fremont, Ohio

[73] Assignee: S. E. Hyman Company, Fremont, Ohio

[22] Filed: Feb. 19, 1974

[21] Appl. No.: 443,360

[52] U.S. Cl. ............................ 297/229; 297/391
[51] Int. Cl. ............................................ A47c 31/10
[58] Field of Search .................... 297/218–229, 297/391; 5/334 C, 355, 335

[56] References Cited
UNITED STATES PATENTS

| | | | |
|---|---|---|---|
| 1,372,989 | 3/1921 | Baker | 297/220 |
| 1,704,346 | 3/1929 | Schneider | 297/219 X |
| 1,763,001 | 6/1930 | Masury | 297/219 |
| 2,238,795 | 4/1941 | Katzner | 297/224 |
| 2,563,203 | 8/1951 | Yerby | 297/219 |
| 2,630,588 | 3/1953 | Levin | 5/334 C |
| 3,018,133 | 1/1962 | Mills | 297/404 X |
| 3,208,794 | 9/1965 | Gunn | 297/219 |

FOREIGN PATENTS OR APPLICATIONS

| | | | |
|---|---|---|---|
| 1,511,646 | 12/1967 | France | 297/219 |

*Primary Examiner*—Francis K. Zugel

[57] ABSTRACT

A slip-over or throw type seat cover for automobile seats having headrests supported by posts that extend out of the top of the back of the seat, which cover is adaptable to fit around such posts. This is accomplished by attaching spaced snap fastener parts on the overlapping flange portion of the cover behind the top back of the seat adjacent the posts, and severing the flange portion between the fastener parts to provide a slit for the post, and then snapping the severed edges together around the posts by the now operative parts on the overlapping edges of the slit.

6 Claims, 9 Drawing Figures

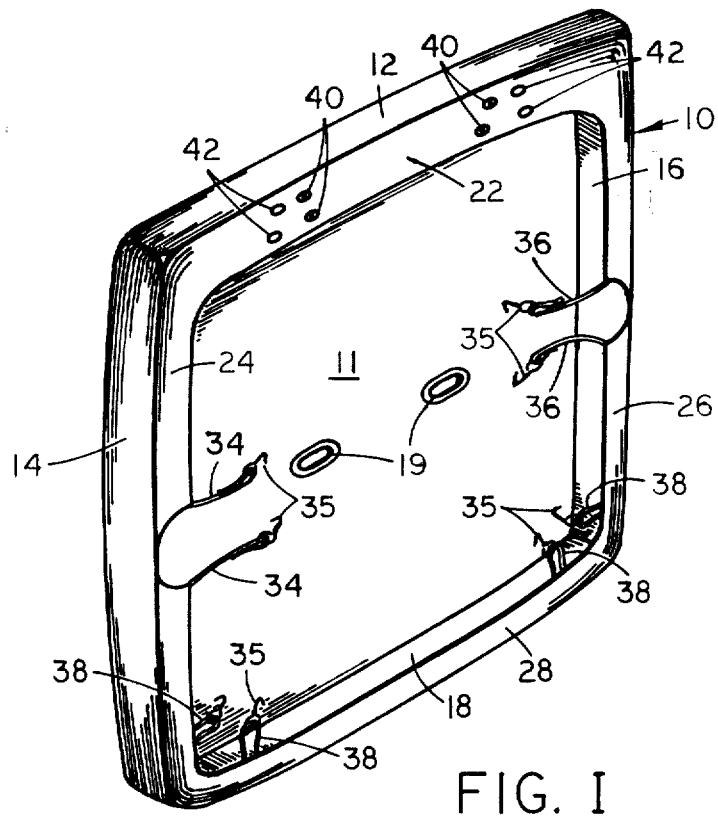
FIG. I
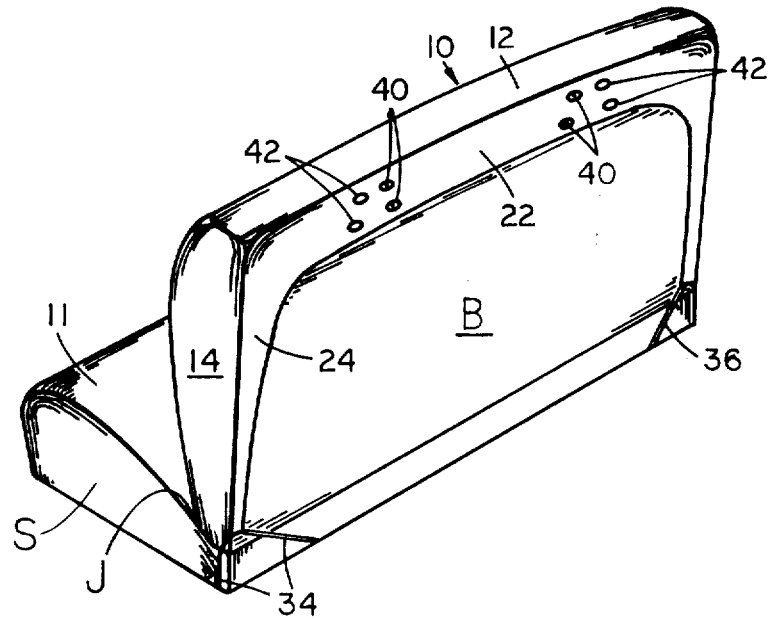
FIG. II

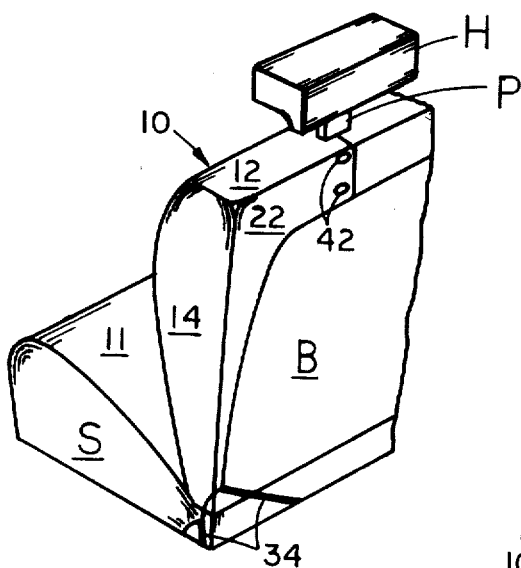
FIG. III
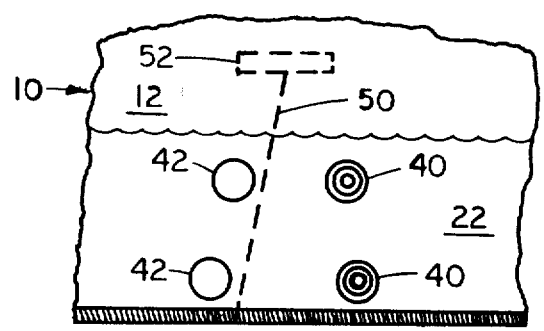
FIG. IV
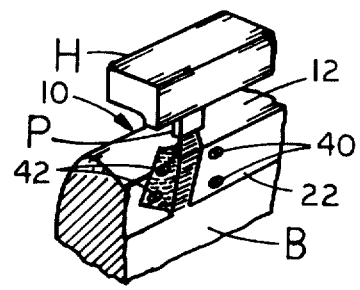
FIG. V
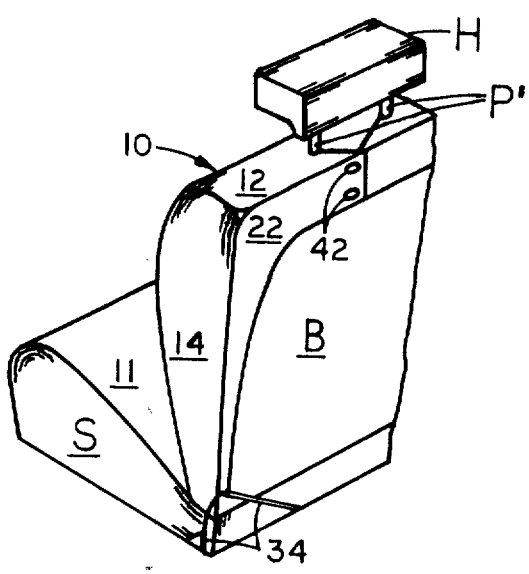
FIG. VI
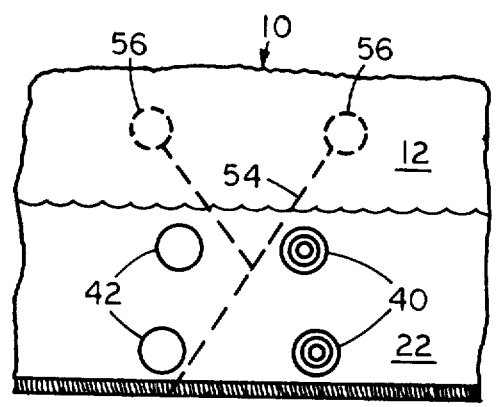
FIG. VII
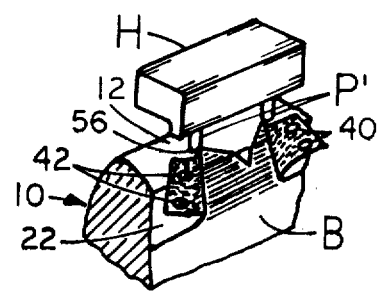
FIG. VIII
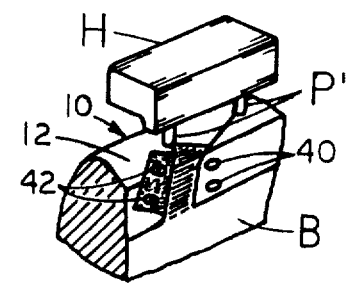
FIG. IX

AUTOMOBILE SEAT COVER

BACKGROUND OF THE INVENTION up until headrests were compulsory on the backs of automobile seats, the throw type or slip-over seat covers could be installed readily by the purchaser thereof, because there were no posts or projections out from the top of the seat to fit these covers around. However, with the advent of headrests and their supporting posts, seat covers then had to be cut, fitted and sewn around the supporting posts for the said headrests.

Accordingly, it is an object of the present invention to produce throw type of seat covers which may be readily adapted to seats which have post supported headrests thereon.

SUMMARY OF THE INVENTION

Generally speaking, the throw type seat cover of this invention comprises a substantially rectangular piece of flexible material preformed to have a front panel portion which covers the front of the back portion of a seat, and usually also the seat portion of a seat, and to have transversely and inwardly formed peripheral portions which extend over and behind the top of the back portion and over the ends of the back and seat portions and over the front of the seat portion. Resilient loops or straps having hooks at their outer ends are attached to the inwardly extending flange edges of seat end and front peripheral portions for anchoring the cover to the springs or other structure under the seat to hold the cover in place.

Since headrests extend outwardly from the center of the back portion of each seat, there are attached spaced pairs of snap fastener stud and cap parts on the peripheral flange portion of the cover that extends over the back portion of the seat adjacent the posts that support the headrests. The stud parts are placed with their studs extending in one direction and along one of two parallel lines extending inwardly from the outer edge towards the post for each headrest, and the cap parts are placed with their concavities extending in the same direction along the other of said two parallel lines transversely opposite their cooperating stud parts. Thus the stud and cup parts cannot be fastened together unless the space between them and said parallel lines has been cut so that they can be overlapped. In the event no headrest or support therefor is provided for the seat which is to be covered, nothing need to be done to the cover other than place it over the seat as done previously without the attached snap fasteners. However, if a post occurs for supporting a headrest, then the peripheral flange of the cover is slit or severed by scissors or a knife between the two parallel lines of fastener parts from its outer edge up to the base of the post, and preferably also a small hole is cut around the post. Thus the cover is fitted around the posts and its slit edges are then overlapped and snapped together by the fastener parts. If there are a pair of parallel supporting posts for each headrest, a Y-shaped slit can be made between the two rows of fastener parts which slit branches to each post.

BRIEF DESCRIPTION OF THE VIEWS

The above mentioned and other features, objects and advantages, and the manner of attaining them are described more specifically below by reference to embodiments of this invention shown in the accompanying drawings, wherein:

FIG. I is a perspective view of the back or inside of a throw type seat cover according to an embodiment of this invention, showing snap fastener parts on one portion of its peripheral flange;

FIG. II is a rear perspective view of a double front seat for an automobile without headrests with the cover shown in FIG. I in place thereon;

FIG. III is a perspective view of the rear left hand portion of a seat similar to that shown in FIG. II with a headrest extending therefrom, and the cover slit and snapped together around the post that supports the headrest in accordance with this invention;

FIG. IV is an enlarged view of that portion of the peripheral flange of the seat cover shown in FIGS. I, II and III to which the snap fastener parts are attached, showing in dotted lines a possible slit between said parts including an oval hole for the post of the headrest shown in FIG. III;

FIG. V is a perspective view of a part of FIG. III showing one side of the slit portion raised for overlapping and snapping together to form the fitted cover shown in FIG. III;

FIG. VI is a perspective view similar to FIG. III but showing a headrest with a pair of parallel supporting posts, and the seat cover with a Y-shaped slit for fitting snugly around them;

FIG. VII is a view similar to FIG. IV but showing in dotted lines the Y-shaped slit cut that can be made foor fitting the cover around the pair of posts shown in FIG. VI;

FIG. VIII is a view similar to FIG. V showing both edges of the slit shown in FIGS. VI and VII raised but fitted around and behind the headrest posts; and FIG. IX is a view similar to FIGS. V and VIII with only one of the flaps down and the other raised but ready to be snapped over the top of the down flap to form the neat fitting cover as shown in FIG. VI.

DETAILED DESCRIPTION OF PREFERRRED EMBODIMENTS

Referring first to FIGS. I and II, there is shown an embodiment of the slip-on seat cover 10 of this invention which comprises a substantially rectangular tray shaped flexible sheet of material having a front cover portion 11 the inside or back of which is shown in FIG. I, which sheet is formed to have peripheral edge portions 12 at the top 14, and 16 on the sides, and 18 at the bottom. Along the rear or free edges of each of these edge portions 12, 14, 16 and 18 there are inwardly extending flange portions 22, 24, 26 and 28, respectively, that fit in around the back B of a seat and/or along the back edges of the sides or ends of the seat S, back B and over the front of the seat S in a vehicle, as shown for example in FIG. II. Midway along the flange portions 24 and 26 there may be provided indentations and/or a pair of elastic loops 34 and 36, respectively, to which loops may be connected S-shaped hooks 35 that may be fastened under the seat as shown in FIG. II to the springs or other structure thereunder to stretch and hold the cover in place, particularly in the joint J between the back B and seat S as shown in FIG. II along which the panel 11 may contain apertures 19 for seat belts. Also there may be provided with the seat cover 10 shown in FIG. I, a pair or more of hollow paper tubular sections (not shown) which may be forced into the crack or joint J for preventing the pull out of the mid-portion of the cover panel 11. Along the bottom or front flange 28 that fits along or under the front edge of the seat S, there may be provided additional elastic loops 38 as shown in FIG. I to which other hooks 35 may be connected for connection under the seat S for stretching and holding the front edge of the seat cover 10 in place.

If the back B of the seat of the vehicle does not have any headrest thereon, then the top edge portion 12 of the seat cover 10 smoothly fits across the top of the back B, and its adjacent flange portion 22 smoothly stretches and fits across the top of the back B. Then only the pairs of the unused fastener parts 40 and 42 are seen and no slit is made between them.

Referring now to FIG. III, the back B is shown to have extending upwardly from its center top portion, a headrest H with a single post P for its support. Since the edge portion 12 of flange 22 will not fit over the headrest H, but could fit around the post P is an aperture were provided in the edge portion 12 therefor, this can readily be done without spoiling or resewing the cover flange by forming a slit between the fastener stud parts 40 and the cap parts 42, as shown by the dotted line 50 in FIG. IV, the inner end of which may be provided with a cut-out portion or hole 52 to fit around the post P. Once this flange portion 22 and part of the back portion 12 is so severed or cut as shown in FIG. IV, it can be fitted readily around the post P as shown in FIG. V and the cap parts 42 of the snap fasteners then may be pulled to overlap slit edges of the cut 50 and to engage and snap onto the stud portions 40 to complete the fitting of the seat covers around the headrest H and smoothly over the back of the seat B as shown in FIG. III.

In the event the headrest H is provided with a pair of parallel supporting posts P' as shown in FIG. VI, then the flange portion 22 and top portion 12 of the slip seat cover 10 may be provided with a Y-slit such as 54 shown in FIG. VII, extending from the outer free edge of the flange portion 22, between the stud parts 40 and cap parts 42 of the snap fasteners, and then branched upward to where the posts P' will extend through the peripheral portion 12, where holes 56 may be cut out for these posts P'. Then the seat cover is fitted around these posts P' as shown in FIG. VIII with the posts P' in the holes 56, and the slit edges of the flange portion 22 may then be pulled together and overlapped as shown in FIG. IX and snapped together to provide the flush smooth fit around posts P' of the headrest H shown in FIG. VI.

Although the snap fastener parts 40 and 42 are provided with studs and caps, other types of fasteners, such as hook and eye type fasteners, may be employed without departing from the scope of this invention, and other shaped and/or angled cuts or slits than cuts 50, 52, 54 and 56 as shown in FIGS. IV and VII may be made, so long as they extend from the outer or free edge of the flange portion 22, between the two parallel rows or lines of studs 40 and the caps 42, and to and/or around the post P or P'.

It also should be noted that one pair instead of two pair of snap fasteners 40, 42 may be employed, or if desired three or more snap fasteners 40, 42 may be employed along the parallel lines extending toward the post P or P'' on the portions 12 of the seat cover 10.

If the particular seat cover is for a single seat, then of course only one pair of snap fasteners 40, 42 would be provided for the single headrest for the single seat.

The flexible sheet material of the seat cover 10 may be fabric, plastic, elastic, foam backed, or the like. Preferably it should be stretchable at least for its peripheral edge and flange portions 12, 14, 16, 18, 22, 24, 26 and 28, so as to form smoothly over and to the contour of the seat S and its back B, as well as to permit pulling of the edges of the slit portions 50 and 54, so they can be overlapped to easily snap the fastener parts 40 and 42 together. For example, a knit fabric with a foam backing has been found to be very satisfactory and may have any desired color and/or designs thereon, and have reinforced portions at the edges thereof, without departing from the scope of this invention.

While there is described above the principles of this invention in connection with specific apparatus, it is to be clearly understood that this description is made only by way of example and not as a limitation to the scope of this invention.

I claim:

1. A throw type seat cover for at least the back of a seat of a vehicle having a headrest supported by at least one post above the top of the back, said cover comprising:
    A. a front cover panel portion,
    B. peripheral edge cover portions,
    C. a flange portion along the rear section of said edge portion, and
    D. at least one pair of spaced snap fastener parts on said flange portion adjacent the post for the headrest said fastener parts comprising:
        a. a stud part with a stud extending outwardly from one side of said flange portion, and
        b. a cap part with its concave portion extending inwardly from the other side of said flange portion, said fastener parts being spaced inwardly from the outer edge of said flange portion, whereby said fastener parts can not be fastened until a slit is made inwardly from the free edge of said flange portion between said fastener parts to the post so that the edge portion can surround said post and the edges of said slit flange portion may be overlapped so that said snap fastener parts may be snapped together to hold said slit in said flange together around the post, and whereby said cover also can be used without slitting when there is no headrest.

2. A cover according to claim 1 including the slit wherein the inner end of said slit is provided with an aperture for and fitting around the post.

3. A cover according to claim 1 including the slit comprising a plurality of said snap fasteners along each slit.

4. A cover according to claim 1 wherein said caps are spaced from said studs along parallel lines toward the post.

5. A cover acccording to claim 4 wherein said parallel lines straddle the post.

6. A seat of a vehicle having a back, a pair of posts extending upwardly from the top of said back, a headrest supported by said posts, and a throw type seat cover for at least said back of said seat, said cover comprising:
A. a front cover panel portion,
B. peripheral edge cover portions, and
C. a flange portion along the rear section of said edge portion, the improvement comprising:
D. at least one pair of spaced snap fastener parts on said flange portion adjacent said posts, and
E. a Y-shaped slit branching inwardly from the free edge of said flange portion between said fastener parts to said posts so that the ends of said slit can surround said posts and the edges of said slit may be overlapped so that said snap fastener parts may be snapped together to hold said slit in said flange portion together around said posts.

* * * * *

PO-1050
(5/69)

UNITED STATES PATENT OFFICE
CERTIFICATE OF CORRECTION

Patent No. 3,892,440  Dated July 1, 1975

Inventor(s) Richard J. and Harold A. Dudley

It is certified that error appears in the above-identified patent and that said Letters Patent are hereby corrected as shown below:

Column 1, line 4, change "up" to - - Up - -. Column 2, line 35, change "foor" to - - for - -. Column 3, line 26, change "is" to - - if - -; line 39, change "covers" to - - cover - -. Column 4, line 58, after "slit" insert - - and - - .

Signed and Sealed this twenty-eight Day of October 1975

[SEAL]

Attest:

RUTH C. MASON
Attesting Officer

C. MARSHALL DANN
Commissioner of Patents and Trademarks